US006760959B2

United States Patent
Grear

(10) Patent No.: US 6,760,959 B2
(45) Date of Patent: Jul. 13, 2004

(54) DEVICE FOR PRODUCING MATERIAL HAVING OPTICALLY VARYING EFFECTS AND METHOD OF PRODUCING THE SAME

(76) Inventor: Philip Joseph Grear, 4437 N. Kenneth Ave., Chicago, IL (US) 60630

( * ) Notice: Subject to any disclaimer, the term of this patent is extended or adjusted under 35 U.S.C. 154(b) by 373 days.

(21) Appl. No.: 10/008,071

(22) Filed: Nov. 13, 2001

(65) Prior Publication Data

US 2002/0038789 A1 Apr. 4, 2002

Related U.S. Application Data

(62) Division of application No. 09/238,846, filed on Jan. 28, 1999.
(60) Provisional application No. 60/073,008, filed on Jan. 29, 1998.

(51) Int. Cl.[7] .............................................. B21D 21/00
(52) U.S. Cl. ...................... 29/17.2; 76/107.1; 427/162; 427/405
(58) Field of Search ........................ 29/17.2; 76/107.1; 427/162, 405

(56) References Cited

U.S. PATENT DOCUMENTS

| 3,843,763 | A | * | 10/1974 | Coll-Palagos | ................ | 264/219 |
| 4,197,798 | A | * | 4/1980 | Bardin | ........................ | 101/153 |
| 4,503,769 | A | * | 3/1985 | Andersen | ...................... | 101/153 |
| 5,761,801 | A | * | 6/1998 | Gebhardt et al. | ............... | 29/846 |

* cited by examiner

Primary Examiner—Allan Olsen
(74) Attorney, Agent, or Firm—Jon C. Gealow

(57) ABSTRACT

A die and a method for forming a die to produce optically varying effects in a light reflective surface. A design generally formed as a plurality of parallel grooves of varying widths and depths are engraved in a soft metal foil adhered to a substrate. A hard metal coating is formed on the engraved soft metal foil in a metal plating bath. The hard metal coating, removed from the soft metal foil provides a die formed as a mirror image of the grooves engraved in the soft metal foil. The die is used to deform a reflective surface such that the surface produces optically varying effects. A die formed in the same manner with further processing is used to both deform a reflective surface and hot stamp it to a substrate.

6 Claims, 2 Drawing Sheets

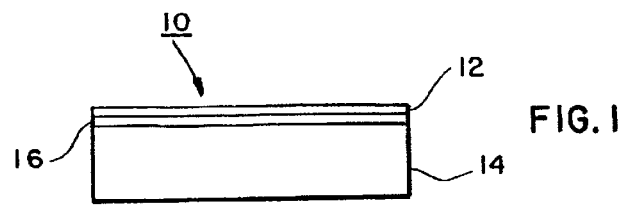
FIG. 1
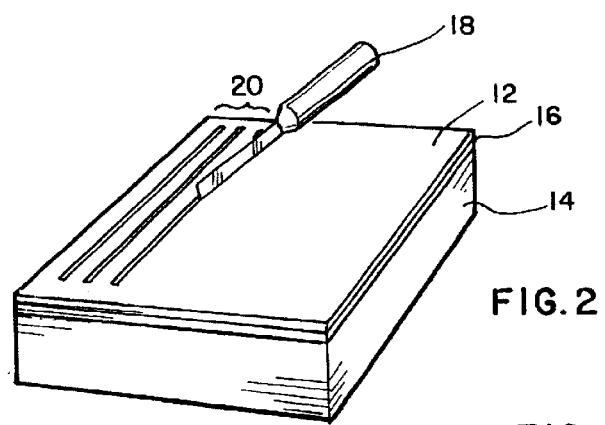
FIG. 2
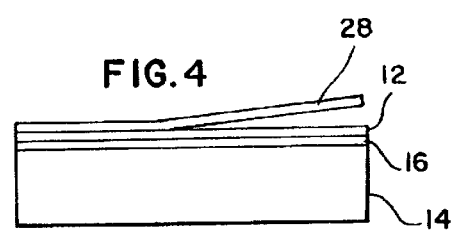
FIG. 4
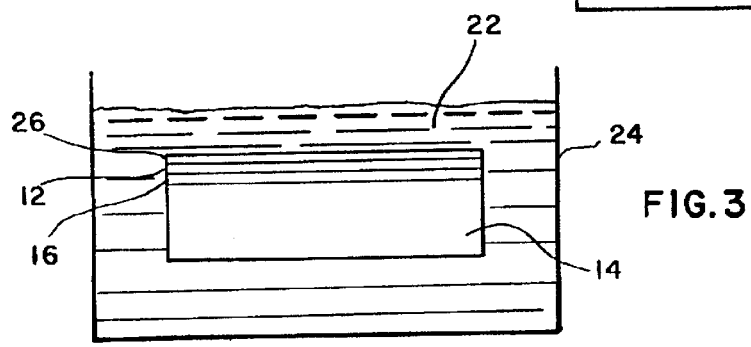
FIG. 3
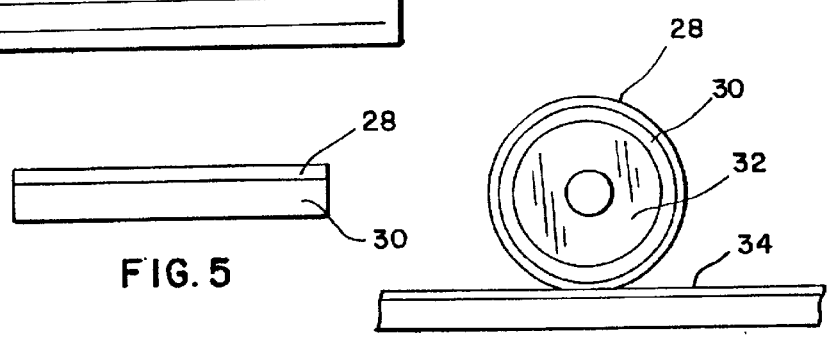
FIG. 5
FIG. 6

DEVICE FOR PRODUCING MATERIAL HAVING OPTICALLY VARYING EFFECTS AND METHOD OF PRODUCING THE SAME

This application claims the benefit of Provisional Application No. 60/073,008 filed Jan. 29, 1998

This application is a division of copending U.S. application Ser. No. 09/238,846, filed Jan. 28, 1999.

BACKGROUND OF THE INVENTION

1. Field of the Invention

This invention relates generally to the production of interesting optical effects by grooves formed in a light reflecting surface, and more specifically, this invention relates to a method and apparatus for mass producing light reflecting surfaces having grooved surfaces.

2. Description of the Prior Art

It is known that various interesting and pleasing optical effects can be achieved by placing grooves or lines in a reflecting surface, such as a metallic foil. An example of a use of these optical effects may be found in certain handmade greeting cards.

While the effects achieved with such reticulated prior art arrangements can be quite impressive, they have been limited in applicability because of the inability to mass produce such grooves surfaces. Previous attempts to hot stamp metallic foil or other light reflecting surfaces in web printing have not been very successful.

Since there are many uses for the optical effects that may be achieved with lined surfaces of this type, a process by which such items could be mass produced, such as by using a web type press, would be most beneficial. The limited number of such items which can be hand or individually produced is economically unfeasible for many applications which would be feasible with a web type press production method.

SUMMARY OF THE INVENTION

The present invention provides a method of mass producing reticulated devices that have desirable optical effects. In accordance with this invention, a hand or computer generated engraving is first made in a relatively soft deformable metal foil which is secured to a more rigid substrate, with an intervening deformable material therebetween, which together form a laminated structure. Using suitable hand engraving tools, having engraving edges of varying sizes and shapes, a hand engraved design is formed in the metal foil. An engraved design may also be generated by a computer and engraved by computer controlled engraving tools. The design is typically formed by making a plurality of parallel depressions in the foil. The parallel depressions are made of varying depths and widths by the use of various tools, and by manipulating each of the tools, such as by rotating and by applying variable pressures to the tools. In forming the parallel depressions of varying widths and depths, the metal foil is depressed into the deformable material, which retains the shape of the parallel depressions formed in the metal foil, and provides backup support to the deformed foil.

The laminated structure, with an engraved design formed therein, is placed in a metal plating bath, in a plating tank, to form a relatively hard metal coating over the engraved soft deformable metal foil. The laminated structure is maintained in the metal plating bath for a sufficient length of time to form a hard metal coating on the soft metal foil, which coating is of sufficient strength to be used as a die which is in the form of a mirror image of the grooves first formed in the soft deformable metal foil. The die may then be used to form grooves, corresponding to those first engraved in the soft deformable metal foil, in a metal foil, a metallized Mylar foil, or similar material which is capable of being deformed to the shape of the hand or computer controlled engraved grooves.

Upon being removed from the metal plating bath, the laminated structure, and more particularly the soft metal foil, is separated from the hard metal coating. The hard metal coating thus forms a hard metal plate having a mirror image of the engraved design therein. While the metal plate is hard in the sense of retaining the engraved surface thereon, it is also, in its entirety, somewhat flexible. That is, while it is generally formed as a flat surface, it can be resiliently bend into a curved form. One side of a substrate, which has an adhesive on both sides, is secured to the back side of the hard metal plate which was separated from the soft metal foil. The hard metal plate is then secured to the drum of a web type printer by the adhesive on the second side of the substrate. With the hard metal plate secured to the web printer drum, the web printer may be used to apply the originally hand or computer formed engraving, to a material engaged by the hard metal plate on the drum, as it is passed through the web type printer.

One of the preferred metals for use in the metal plating bath to form the hard metal coating is a compound containing a significant amount of nickel and also iron. However, other metals having similar desirable characteristics may also be used. Typically, of the materials to which the engraving may be imparted are metal foils, metallized Mylar, and other highly reflective materials.

BRIEF DESCRIPTION OF THE DRAWINGS

FIG. 1 shows a laminated structure in accordance with the present invention having a surface suitable for engraving;

FIG. 2 shows the laminated structure of FIG. 1 being hand engraved;

FIG. 3 shows the engraved laminated structure of FIG. 2 being metal plated in a metal plating bath;

FIG. 4 shows the laminated structure being separated from the metal plating applied in the metal plating bath as shown in FIG. 3;

FIG. 5 shows the metal plate with a substrate secured thereto, which substrate is provide with an adhesive on each side; and FIG. 6 shows the metal plate applied to the drum of a web type printer.

DETAILED DESCRIPTION OF THE PREFERRED EMBODIMENT

Figure 7:
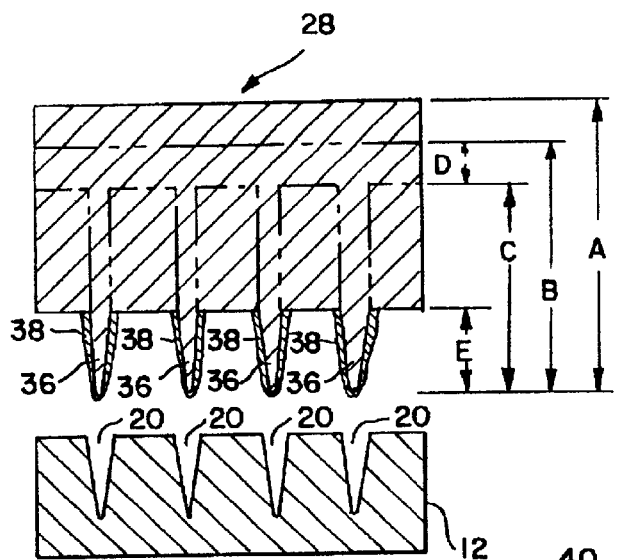
FIG. 7 shows a cross-section of a portion of an engraved soft deformable metal foil, and a metal plate formed therefrom in accordance with a second embodiment of this invention.

Referring to FIG. 1, in accordance with the method of this invention, a hand or computer generated engraving is first made in a soft aluminum foil which is secured by a pressure sensitive material to a plastic substrate, forming a laminated structure 10 suitable for engraving. A soft deformable metal foil 12, such as aluminum foil, is secured to a deformable substrate 14, such as a plastic substrate, by a layer of pressure sensitive material 16, which has the desired adhesive properties to adhere to the soft deformable metal foil 12 and the deformable substrate 14. In a preferred embodiment of this invention, the soft deformable metal foil 12 is an aluminum foil approximately 0.0003" thick, the pressure sensitive adhesive material 16 is preferably at least as thick as the aluminum foil 12, and the deformable substrate is formed of a plastic sufficiently strong to provide a somewhat rigid backing for the aluminum foil 12 and pressure sensitive material 16. A plastic substrate approximately ⅛" thick has been found to provide the desired backing for a suitable laminated structure upon which engraving may be undertaken.

Referring to FIG. 2, using suitable hand engraving tools, one of which is shown as 18, an engraved design 20 is formed in the aluminum foil 12. The hand engraved design is typically formed by making a plurality of parallel depressions in the foil, typically 100 per inch. The parallel depressions are made of varying depths and widths by the use of various tools, and by manipulating, such as by rotating and applying variable pressure to the tools. In forming the parallel depressions of varying widths and depths, the aluminum foil 12 is depressed into the pressure sensitive material 16, which is formed of a material which will retain the shape of the parallel depressions formed in the aluminum foil. The depressions may be as deep as the thickness of the aluminum foil 12.

Referring to FIG. 3, the laminated structure 10, with an engraved design 20 formed therein is placed in a nickel or other suitable metal plating bath 22 in a plating tank 24 to form a hard metal coating 26 on the engraved soft deformable metal foil. The laminated structure 10 is maintained in the bath 22 for a sufficient length of time to form a hard metal coating, which is approximately 0.010 inches thick, on the aluminum foil 12.

Referring to FIG. 4, upon being removed from the bath 22, the laminated structure 10 is separated from the hard metal coating 26. That is, the aluminum foil 12 is separated from the hard metal coating 26. The hard metal coating 26 thus forms a hard metal plate 28 having the mirror image of the engraved design formed therein.

Referring to FIG. 5, one side of a substrate 30, which has an adhesive on both sides, is applied to the side of the hard metal plate 28 opposite that which was separated from the soft deformable metal foil 12. Referring to FIG. 6, the hard metal plate 28 is then secured to a drum 32 by the adhesive of the second side of the substrate 30. With the flexible hard metal plate completely encircling and secured to the drum 32, it may be used in a web printer for applying engraving to a material 34 engaged by the hard metal plate on the drum. Typically, of the materials to which the engraving is imparted are metal foils, metallized Mylar, and other highly reflective materials.

While in the preferred embodiment, the thickness of the soft aluminum foil is 0.0003" thick, it has also been found that foil up to approximately 0.0007" may be used in accordance with this invention. It has also been found, depending up various variable characteristics of a web type printer, that the hard metal plate which is formed to be placed a web printer drum may be up to approximately 0.030" thick.

In another or second embodiment of this invention, the hard metal plate or die 28 is further processed, such that it may be used to hot stamp a metal foil to a substrate such as a paper board in grooves corresponding to those first formed in the soft deformable metal foil. Machinery has recently been developed for providing a station, in a line on a web press, to hot stamp foil on continuous rolls of paper board. These web presses are primarily intended to print paper board used by the folding carton industry. The station is formed of two sets of two cylinders. Each set has an upper magnetic roller that holds a thin double level plate and a base roller that has a rubber compound cover with a hardness just softer than steel. As the web passes through the first set of cylinders, foil is applied with heat and pressure in a very smooth mirror like finish to the underlying continuous roll of paper board. The second set of cylinders engraves a computer generated hologram image to the foil.

In accordance with the second embodiment of this invention, the further processed hard metal plate or die 28 is affixed to the magnetic cylinder which applies the foil, such the foil is simultaneously applied and embossed on the paper board. Using the modify die 28 in this manner, the foil is only applied to the paper board in grooves corresponding to those first formed in the soft deformable metal foil.

Referring to FIG. 7, the further processing of the hard metal plate or die 28 in accordance with the second embodiment of this invention will be described. The soft originally engraved metal foil 12 is shown with grooves 20 formed therein. The hard metal plate 28 formed as a hard metal coating 26 on the engraved metal foil 12 in a plating tank is shown positioned above the engraved metal foil 12. As originally formed in the plating tank 24, the hard metal plate 28 is approximately 0.025 inches thick as represented by the dimension "A". Since the electroform plating process does not usually result in a uniform thickness, the back of the plate 28 is machined or ground to provide a plate of uniform thickness of approximately 0.020 inches as represented by the dimension "B". The projections 36 on the engraved side of the plate, which represent mirror images of the grooves first formed in the soft deformable metal foil are provided with a protective coating 38, such that when the engraved side is exposed to an acid for etching, the projections 36 are not etched. The etching is continued until the hard metal plate 28 is etched to a depth of approximately 0.012 inches, as represented by the dimension "C". Thus, the hard metal plate is left with a base thickness of 0.008 inches as represented by the dimension "D". The projections 36 as formed in the plating tank 24 are approximately 0.0003 inches high as represented by the dimension "E".

Figure 8:
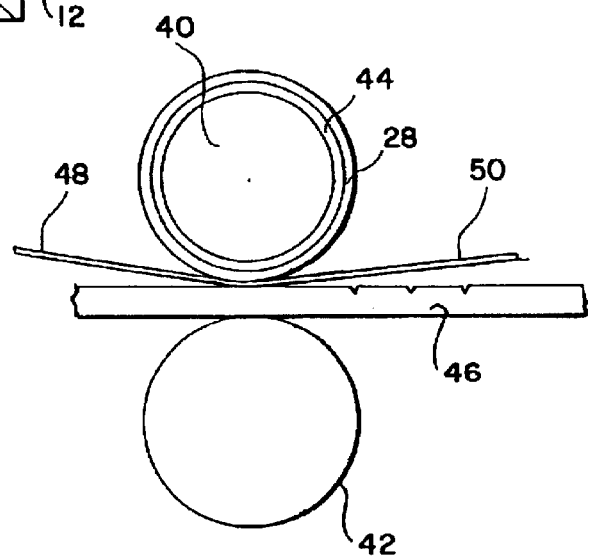
FIG. 8 shows the metal plate of FIG. 7 used to hot stamp foil to a paper board.
Figure 9:
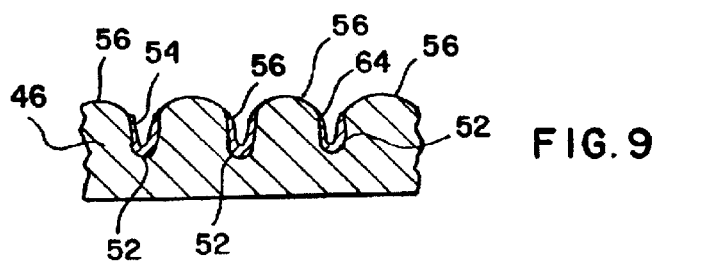
FIG. 9 shows a partial cross-sectional view of foil hot stamped to a paper board in accordance with the second embodiment of this invention.

Referring to FIG. 8, the hard metal plate 28, as formed in the second embodiment is secured to the upper roller 40 of a set of rollers 40 and 42 forming the set of roller in a station to hot stamp foil on a continuous roll of paper board. The upper roller 40 has a magnetic layer 44 which is used to secure the hard metal plate 28 to the roller. The lower 10 roller 42 has a rubber compound cover with a hardness just softer than steel for materials up to 0.010 inches thick. For thicker materials a steel cover may be used. As a continuous strip of paper board 46 is feed between the rollers 40 and 42, a continuous strip of foil 48 is fed on top of the paper board 46 and under the hard metal plate 28. The only portions of the hard metal plate 28 which contact the strip of foil 48 are the projections 36. Thus, the only portions of the foil strip 48 which are hot bonded or stamped to the paper board 46, are those pressed by the projections 36 into the paper board 46. The remaining portions 50 of the foil strip are drawn away from the paper board 46. As shown in FIG. 9, foil 52 is only bonded to the paper board in the depressions 54 formed by the projections 36. Further, the areas 56 between the depressions 54 is forced upward, thereby embossing the paper board 46. As previously set forth, a second set of cylinders may be employed to engrave a computer generated hologram image on the foil 52 bonded in the depressions 54.

While only two embodiments of the invention have been shown and described, it should be apparent to those skilled in the art that what have been described are considered at present to be preferred embodiments of the device and method of this invention. In accordance with the Patent Statute, changes and modification, may be made in the methods and devices of this invention without actually departing from the true spirit and scope of this invention. The appended claims are intended to cover all such changes and modification which fall in the true spirit and scope of this invention.

What is claim is:

1. A method for producing a die for use in deforming a reflective material so as to provide optically varying effects comprising the steps of:

(1) engraving depressions, capable of producing optically varying effects in a reflective material, in a soft deformable metal foil which is secured to a more rigid but deformable substrate so as to form a laminated structure, such that the engraved depressions are retained in the metal foil which is depressed into the deformable substrate, (2) placing the engraved laminated structure in a metal plating bath to form a hard metal coating over the soft deformable metal foil, (3) removing the hard metal coating which has mirror images of the engraved depressions formed therein from the deformable metal foil, whereby the hard metal coating may be used as a die to form depressions in a reflective material capable of being deformed to the shape of the engraved depressions so as to provide optically varying effects.

2. The method for producing a die for use in deforming a reflective material so as to provide optically varying effects of claim 1, wherein said soft deformable metal foil is 0.0003 to 0.0007 inches thick.

3. The method for producing a die for use in deforming a reflective material so as to provide optically varying effects of claim 1, wherein said hard metal coating is approximately 0.010 inches thick.

4. The method for producing a die for use in deforming a reflective material so as to provide optically varying effects of claim 1, wherein said metal coating is a compound containing a significant amount of nickel.

5. The method for producing a die for use in deforming a reflective material so as to provide optically varying effects of claim 1, wherein said deformable substrate is formed of a plastic, and is secured to said soft deformable metal foil by a pressure sensitive material.

6. A die for use in deforming a reflective material so as to provide optically varying effects formed by:

(1) engraving depressions, capable of producing optically varying effects in a reflective material, in a soft deformable metal foil which is secured to a more rigid but deformable substrate so as to form a laminated structure, such that the engraved depressions are retained in the metal foil which is depressed into the deformable substrate, (2) placing the engraved laminated structure in a metal plating bath to form a hard metal coating over the soft deformable metal foil, (3) removing the deformable metal foil from the hard metal coating which has mirror images of the engraved depressions formed therein, whereby said hard metal coating is formed as a die.

* * * * *